United States Patent [19]

Sokolowski

[11] 3,993,186

[45] Nov. 23, 1976

[54] MEANS FOR GUIDING A CONVEYOR BELT

[76] Inventor: Paul R. Sokolowski, 6888 Vernmoor, Troy, Mich. 48084

[22] Filed: July 30, 1975

[21] Appl. No.: 600,134

[52] U.S. Cl. .............................................. 198/806
[51] Int. Cl.² .......................................... B65G 15/64
[58] Field of Search .................................... 198/202

[56] References Cited

UNITED STATES PATENTS

| | | | |
|---|---|---|---|
| 2,451,394 | 10/1948 | Klein | 198/202 |
| 2,570,364 | 10/1951 | Mercier | 198/202 |
| 2,653,700 | 9/1953 | Sloane | 198/202 |
| 2,655,251 | 10/1953 | Bankauf | 198/202 |
| 2,664,994 | 1/1954 | Tourneau | 198/202 |
| 2,797,794 | 7/1957 | Bradley | 198/202 |
| 2,873,022 | 2/1959 | Murphy | 198/202 |
| 2,892,534 | 6/1959 | Ogden | 198/202 |
| 3,058,574 | 10/1962 | Gianukos | 198/202 |
| 3,203,537 | 8/1965 | Holladay et al. | 198/202 |
| 3,513,966 | 5/1970 | Eckels | 198/202 |

FOREIGN PATENTS OR APPLICATIONS

| | | | |
|---|---|---|---|
| 138,365 | 5/1948 | Australia | 198/202 |

*Primary Examiner*—Johnny D. Cherry
*Assistant Examiner*—Richard K. Thomson
*Attorney, Agent, or Firm*—William L. Fisher

[57] ABSTRACT

Improvement in a mechanism for guiding a belt on a conveyor comprising a belt guide having a roller and belt guide members at opposite ends of the roller, a hanger for hanging the roller from a conveyor so that the roller pushes upon the slack side of the conveyor belt, an arrangement providing a pivot axis by which the roller can rotate in respect to the hanger during operation of the conveyor, the device utilizing the left or right sideways movement of the belt to engage one of the guide members and rotate the roller about the pivot axis so that the belt is automatically moved by the device toward the position from which it originally commenced to move, the improvement comprising a roller frame for the roller, an axle made fast to the roller frame, the roller rotatably carried on the axle, the belt guide members carried on the axle and made fast to the roller frame, the belt guide members having belt-contacting surfaces for engaging opposite edges of the belt, each belt-contacting surface disposed at an obtuse angle to the axle, the hanger comprising a hanger frame constructed for attachment to the frame of the conveyor, the arrangement providing a pivot axis comprising a pivot shaft carried in the hanger frame, a pair of thrust bearings for the pivot shaft and an arrangement for holding the thrust bearings in place in the hanger frame at opposite ends of the pivot shaft, whereby during operation of the device the roller rotates freely in spite of the belt pressure thereon.

1 Claim, 14 Drawing Figures

MEANS FOR GUIDING A CONVEYOR BELT

My invention relates to conveyors.

The principal object of my invention is to provide an improved belt guide device and method of guiding belts of conveyors during operation thereof.

The foregoing object of my invention and the advantages thereof will become apparent during the course of the following description, taken in conjunction with the accompanying drawings, in which.

Figure 1:
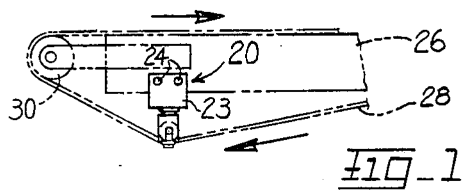
FIG. 1 is a fragmentary side elevational view of a conveyor belt guide device embodying my invention shown in operation on a conveyor.
Figure 14:
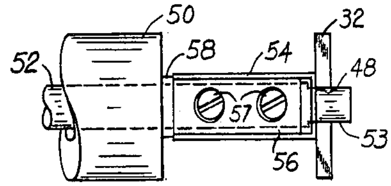
FIG. 14 is a bottom plan view of the structure of FIG. 12 taken on the line 14—14 thereof.
Figure 2:
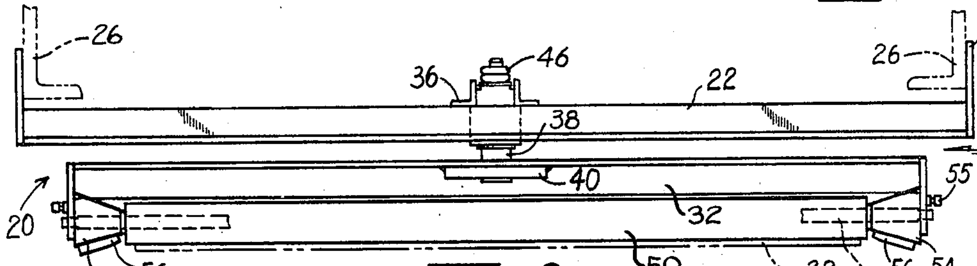
FIGS. 2–4 are, respectively, front, side elevational and top plan views of said embodiment.
Figure 3:
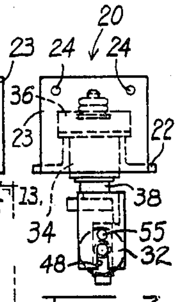
Figure 4:
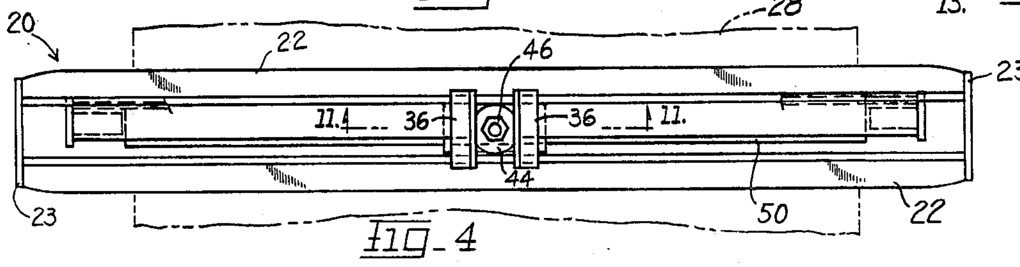

Referring to the drawings in greater detail, 20 generally designates said device which has hanger means by which said device can be hung on a frame 26 of a conveyor (having a belt 28 and rollers 30) as shown and belt guide means rotatably suspended from said hanger means. Said hanger means, in the instance, consists of a main bar formed of a pair of spaced apart angle iron members 22 and end plates 23 which are welded to each other. Said hanger means is fastened to said frame 26 by said end plates 23 and fasteners 24. Said belt guide means consists of a roller frame 32 formed, in this instance, of a main angle iron member and end plates which are welded to each other. The frame 32 is provided, via said last-mentioned end plates, with slots 48 for accommodating the ends of a roller shaft 52. Said belt guide means also consists of a roller 50 which is rotatably supported, via bearing 51, on said shaft 52 and arranged to press downwardly upon the slack side of said conveyor belt 28 as shown in FIG. 1 and belt guide members 56 at opposite ends of said roller 50. Said guide members 56 are fastened, via fasteners 57, to guide holders 54 which are held, via central bores therethrough, on said shaft 52 and have tapered top and bottom surfaces so that the surfaces of said guide members 56 which engage the edges of said belt 28 are disposed at obtuse angles in respect to said belt 28. Said guide holders 54 are held spaced from the opposite ends of said roller 50 via washers 58. Said guide members 56 are made of rubber, in this instance, for use with endless belts but can be made of plastic or steel for belts which are spliced with steel lacing. Said shaft 52 is provided with flats 53 on opposite ends thereof which flats 53 fit in slots 48 to prevent rotation of said shaft 52. Each guide holder 54 is held against rotation about said shaft 52 by means of a jam nut 59 and bolt 55 extending through said frame 32.

Said hanger means and belt guide means are joined to each other by a swivel connection by which said belt guide means is free to rotate about a vertical pivot axis defined by a vertically disposed shaft 38. Said swivel connection consists of said shaft 38 and bushing 34. Said shaft 38 is welded to a plate 40 which in turn is welded to said frame 32. Said shaft 38 has a reduced portion which extends through said bushing 34 and a further reduced threaded portion which extends through a washer 44 and engages a pair of nuts 46 for holding said belt guide means attached to said hanger means. Said bushing 34 is made fast to said members 22 and to a pair of spaced apart cross brace angle iron members 36 and has a pair of thrust bearings 42 at opposite ends thereof.

Figure 6:
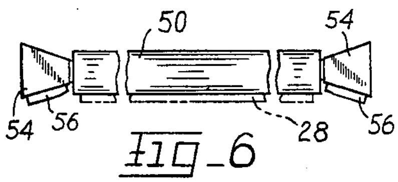
FIGS. 6, 8 and 10 are front elevational views corresponding to FIGS. 5, 7 and 9, respectively.
Figure 8:
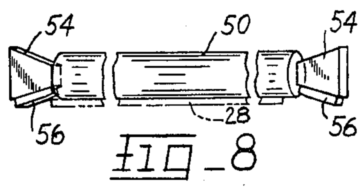
Figure 10:
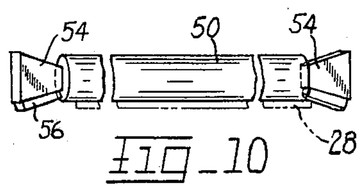
Figure 5:
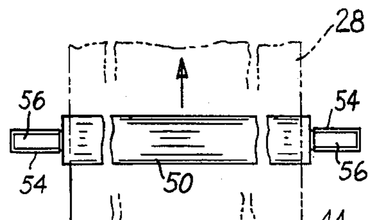
FIGS. 5, 7 and 9 are bottom plan views of portions of said embodiment showing the operation thereof.
Figure 7:
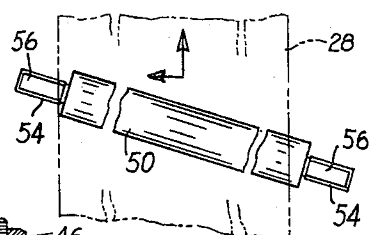
Figure 9:
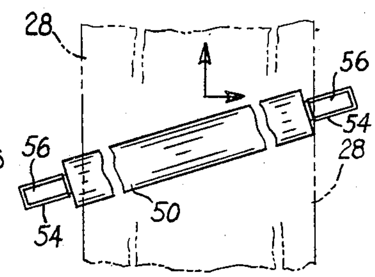
Figure 11:
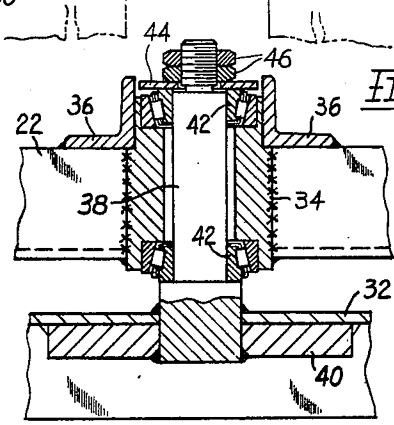
FIG. 11 is a vertical sectional view of the structure of FIG. 4 taken on the line 11—11 thereof.
Figure 12:
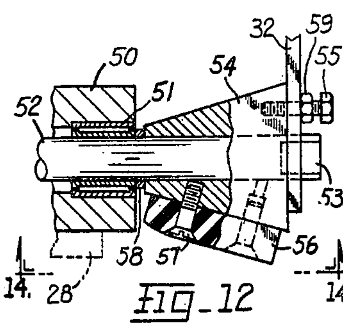
FIG. 12 is a side elevational view of the structure of FIG. 13 taken on the line 12—12 thereof.
Figure 13:
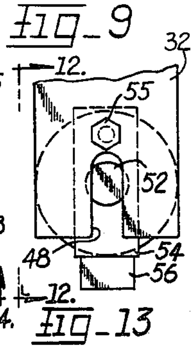
FIG. 13 is a fragmentary side elevational view of the structure of FIG. 2 taken on the line 13—13 thereof.

In operation of said device 20 the same is mounted on a conveyor 26 as shown and described so that said roller 50 applies a downward pressure on the slack side of said belt 50. As shown in FIGS. 5 and 6, as long as the belt 28 remains centered on the conveyor rollers the roller 50 and guide members 56 will remain disposed perpendicular to the direction of travel of said belt (which is indicated by the arrow in FIG. 5.) As shown in FIGS. 7 and 8, if the belt 28 moves sideways in the direction shown by the pertinent arrow in FIG. 7, said belt 28 pushes against the guide member 26 toward which it moves and causes the roller 50 to pivot about said pivot axis 38 as shown in FIG. 7. This pushing upon one of the guide members 26 by the belt 28 and the pivotal movement of the roller 50 opposes the sideways movement of the belt 28 and causes it to return toward the position from which it commenced to move. FIGS. 9 and 10 show the action of the roller 50 and guide members 26 when the belt 28 shifts sideways in the opposite direction as shown by the pertinent arrow in FIG. 9. As the belt 28 commences to move sideways one side thereof becomes tense while the other side slacks and the device 20, by the pivotal movement of the roller 50 and the action of the guide members 26, takes up the slack on the one side and transfers it to the other so as to continuously and automatically maintain the belt 28 centered on the rollers of the conveyor during operation thereof.

It will thus be seen that there has been provided by my invention a belt guide system for guiding the belts of conveyors in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims.

What I claim is:

1. Improvement in means for guiding a belt on a conveyor comprising belt guide means having a roller and belt guide members at opposite ends of said roller, hanger means for hanging the roller from a conveyor so that said roller pushes upon the slack side of said conveyor belt, means providing a pivot axis by which said roller can rotate in respect to said hanger means during operation of said conveyor, said device utilizing the left or right sideways movement of said belt to engage one of said guide members and rotate said roller about said pivot axis so that said belt is automatically moved by said device toward the position from which it originally commenced to move, said improvement comprising a roller frame for said roller, an axle made fast to said roller frame, said roller rotatably carried on said axle, said belt guide members carried on said axle and made fast to said roller frame, said belt guide members having belt-contacting surfaces for engaging opposite edges of said belt, each said belt-contacting surface disposed at an obtuse angle to said axle, said hanger means comprising a hanger frame constructed for attachment to the frame of said conveyor, said means providing a pivot axis comprising a pivot shaft carried in said hanger frame, a pair of thrust bearings for said pivot shaft and means for holding said thrust bearings in place in said hanger frame at opposite ends of said pivot shaft, whereby during operation of said device said roller rotates freely in spite of the belt pressure thereon.

* * * * *